Figures 1, 2:
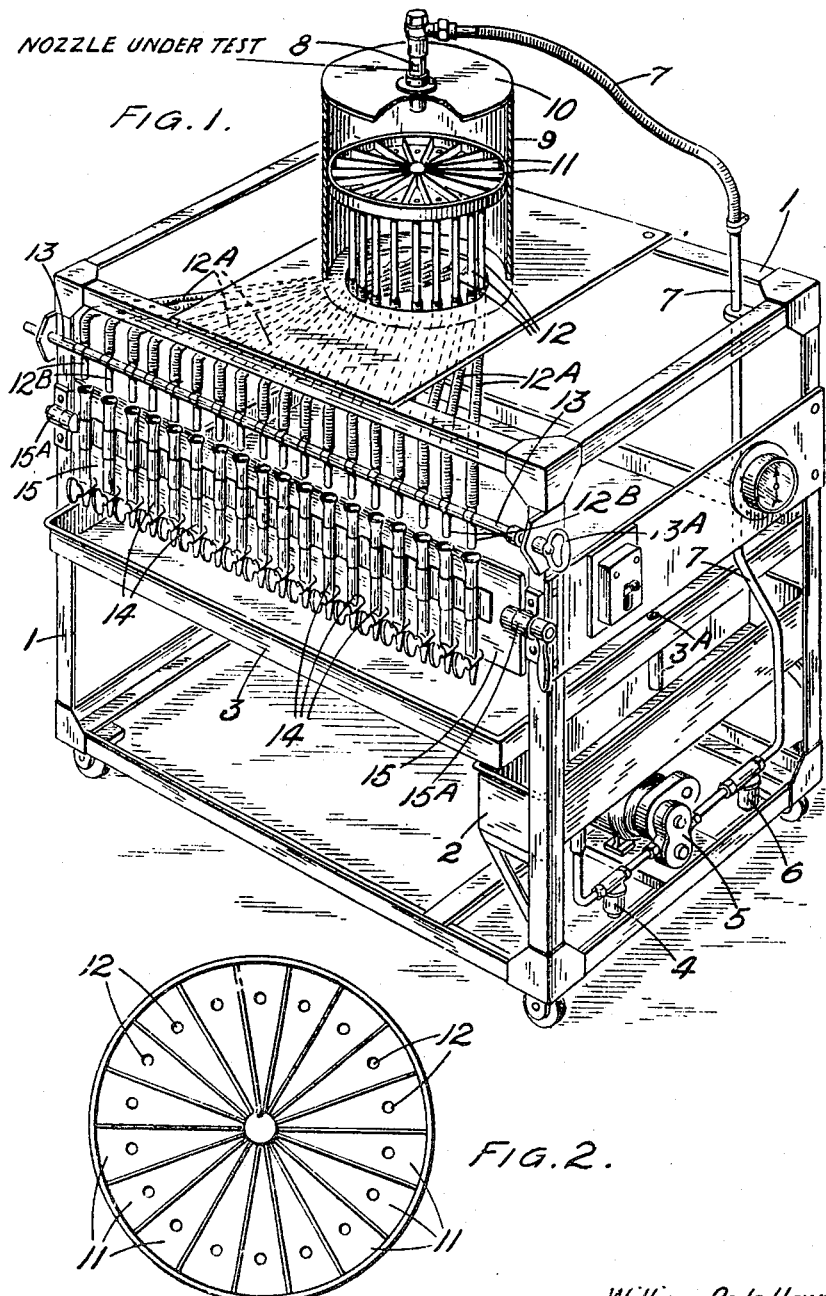

Oct. 4, 1949.　　W. R. HAWTHORNE ET AL　　2,483,637
MEANS FOR TESTING SPRAYING DEVICES
Filed Aug. 8, 1945

William Rede Hawthorne
and John Ruskin Joyce,
　　Inventors

By Stevens & Davis
　　Attys

Patented Oct. 4, 1949

2,483,637

UNITED STATES PATENT OFFICE 2,483,637

MEANS FOR TESTING SPRAYING DEVICES

William Rede Hawthorne, Washington, D. C., and John Ruskin Joyce, Wimbledon, London, England, assignors to Power Jets (Research & Development) Limited, London, England Application August 8, 1945, Serial No. 609,604
In Great Britain August 29, 1941

Section 1, Public Law 690, August 8, 1946
Patent expires August 26, 1962

5 Claims. (Cl. 73—432)

The invention relates to apparatus for testing spraying jets and nozzles of the type which break up or atomize liquids, such as oil burners, paint sprayers, injection nozzles, emulsifiers, and the like, or groups of such devices, which by means well known to those versed in the art, produce a finely atomized spray or cloud of usually appreciably divergent conical form.

In certain applications of such devices it is important from the point of view of obtaining optimum performance that the spray or cloud produced should be uniformly distributed or distributed in some selected manner, in a sense which will be made clear in the general description which follows hereinafter.

It has been established in practice that judgment of spray distribution and quality by simple visual inspection is insufficiently accurate and may be misleading; consequently, the invention seeks to provide an absolute or comparative test whereby uniformity of distribution may be measured, compared or estimated.

The invention consists in means for testing or ascertaining the distribution of the output of a spraying jet or nozzle as a step in the manufacture of such jets, comprising means for detachably supporting the jet or nozzle in a specific and accurately repeatable relationship to a plurality of receivers which are so constituted or adapted as to enable measurement or comparison of quantities simultaneously collected therein. Preferably such means include provision for accurate timing of a test to be achieved by enabling measurement to be taken simultaneously over a given period, in all receivers. One device for achieving this is such that the receivers each have a drain pipe or conduit and the drains collectively and simultaneously can be aimed so as to deliver into measuring vessels or to miss these vessels, at will; the method of operation is then to start the apparatus working, and when stable conditions of flow are established, to operate a control which effects the measured collection of drainage from all receivers simultaneously, the collection being stopped by reversing the control after a chosen time. Thus, the quantity collected by each receiver in the given period can be accurately measured, and the distribution from the jet, etc. may be "mapped" with accuracy, as well (if need be) as the total flow.

It is not essential that the receivers be arranged in a plane normal to the direction of the jet, etc. and indeed there may be applications of the invention where other arrangements are desirable. For example, it may be desired to "map" the distribution over a horizontal area of the deposit from a jet directed horizontally of which the spray is deposited gravitationally, i. e. with a vertical component.

The apparatus according to the invention will now be described by way of example. This apparatus has been designed for the purpose of testing atomizing burner nozzles for use with hydrocarbon liquid fuel and for the perfecting of such nozzles and for their maintenance a reasonably accurate estimation of the "pattern" of the spray has been found to be of considerable importance. The accompanying drawing illustrates the apparatus, Fig. 1 being a perspective view of the complete apparatus in somewhat diagrammatical form and Fig. 2 a plan view of the receivers.

The apparatus consists of a framework built up for example of angle iron members 1 and for convenience mounted on castor wheels. The framework supports a fuel container or tank 2 above which is arranged a tray 3 which drains by a pipe 3A into the container 2. Fuel may flow from the container 2 through a filter 4 into motor driven pump 5 and thence through the filter 6 and pipe 7 to the burner nozzle 8 which is to be tested. Part of the pipe 7 is made flexible to facilitate handling of the nozzle 8. At the top of the apparatus there is provided a cylindrical chamber 9 with a lid 10 which is arranged to be an accurate fit on the top of the chamber. A central and vertical bore in the lid 10 provides for mounting the nozzle 8 rigidly and strictly coaxially, projecting downwardly into the chamber 9. Within the chamber 9 and below the nozzle 8 at an appropriate vertical distance (which may be variable) is provided a floor for the chamber which is divided by radial ribs so that it constitutes a series of receivers 11 symmetrically disposed about the vertical axis of symmetry of the chamber, with which the nozzle is coaxial. Each receiver 11 has a draining pipe 12 leading downwards from it, extensions of the pipes 12 being provided at 12A in the form of flexible lengths of tubing, the run of drain pipe being consistently downwards. Each drain pipe terminates in a spout 12B and the spouts are all mounted, as a gang, on a rod 13 which is supported by the framework 1 and which is slidable by means of a handle 13A. Below the gang of spouts 12B is supported a corresponding gang of measuring receptacles which for convenience are glass burettes 14. These are equally spaced and the spouts 12B are similarly spaced; the gang of spouts is slidable through half the spacing distance of the burettes 14, so that in one extreme position liquid draining from the spouts misses the burettes altogether and in the alternative position, charges them. Thus by shifting the handle 13A the liquid collected by the receivers 11 can be directed into the measuring vessels (burettes) or not, at will, and this simple device ensures that measuring can take place simultaneously from the whole of the receivers and, if required, over a finite time. By opening the taps of the burettes they may be emptied into the tray 3 and consequently back into the container 2. It may, however, be more convenient to mount the gang of burettes on a support 15 which is carried on pivots at 15A in such a way that the whole gang may be tipped over and emptied into the tray 3. The gang may be tilted sufficiently to prevent the spouts delivering into the measuring vessels, as an alternative method of timing instead of shifting the spouts.

In using the apparatus and, for example, for checking purposes, it may be found convenient at times to be able partially to rotate the nozzle 8 about the vertical axis and its mounting in the lid 10 should preferably permit this with readiness. It is found in practice that if there is a marked inequality in pattern of the spray, as shown in inequalities in the collections in the burettes, then partial rotation of the nozzle results in a shift of the inequality of measurement along the gang of burettes and it will be appreciated that this may be a useful cross check on results obtained. The piping system represented by 7 may include a relief valve and a throttle so that the rate of delivery of the nozzle 8 may be varied and the effect of such variation upon the spray pattern may be observed.

To further clarify the nature of the method of testing proposed, it may be compared to the provision of a plurality of rain gauges, since the function of the receivers 11 is comparable.

We claim:

1. Apparatus for testing or ascertaining the circumferential distribution of the output of a spraying jet or nozzle comprising a plurality of similar open receivers arranged symmetrically as a circular series about a vertical axis, and means for supporting the jet or nozzle in a position aligned on said axis and in such specific and repeatable relationship to said plurality of receivers as to result in simultaneous collection therein of the output from the jet or nozzle.

2. Apparatus for testing or ascertaining the circumferential distribution of the output of a spraying jet or nozzle comprising a framework structure, an enclosure at the upper part of said structure, a plurality of receivers forming the floor of said enclosure, means for detachably supporting and locating the jet or nozzle directed inwardly of said enclosure over said receivers, a drain from each of said receivers to deliver liquid gravitationally therefrom to an individual spout, means for supporting a gang of said spouts by said structure below the level of said receivers, a plurality of measuring vessels supported by said structure below said spouts so that there is a vessel associated with each spout, means to enable the positional relationship between the gang of spouts and plurality of vessels to be selected for receipt or non-reception of liquid from the spouts by the vessels, means supported by the structure to collect liquid from said vessels, and means supported by the structure to feed liquid so collected to the jet or nozzle under pressure.

3. Means according to claim 2, wherein the measuring vessels collectively are supported by the said structure tiltably.

4. Apparatus for testing or ascertaining the circumferential distribution of the output of a spraying jet or nozzle comprising a plurality of similar open receivers arranged symmetrically as a circular series about an axis, and means for supporting the jet or nozzle in a position aligned on said axis and in such specific and repeatable relationship to said plurality of receivers as to result in simultaneous collection therein of the output from the jet or nozzle.

5. Apparatus as claimed in claim 4 further comprising a plurality of measuring vessels, means defining a passageway between each receiver and one of said vessels and means for selectively simultaneously adjusting said passageways and the respective vessels to and from a condition of mutual communication.

WILLIAM REDE HAWTHORNE.
JOHN RUSKIN JOYCE.

REFERENCES CITED

The following references are of record in the file of this patent:

UNITED STATES PATENTS

| Number | Name | Date |
|---|---|---|
| 700,683 | Goetze | May 20, 1902 |
| 1,288,363 | Young | Dec. 17, 1918 |
| 2,202,452 | Hildabrand | May 28, 1940 |
| 2,308,672 | Brady | Jan. 19, 1943 |
| 2,368,593 | Glendenning | Jan. 30, 1945 |